US009168862B2

(12) United States Patent
Yang

(10) Patent No.: US 9,168,862 B2
(45) Date of Patent: Oct. 27, 2015

(54) HELMET APPARATUS FOR AUTOMATED VEHICLE HEADING ALERT

(71) Applicant: National Taipei University, New Taipei (TW)

(72) Inventor: Chan-Yun Yang, New Taipei (TW)

(73) Assignee: NATIONAL TAIPEI UNIVERSITY, New Taipei (TW)

( * ) Notice: Subject to any disclaimer, the term of this patent is extended or adjusted under 35 U.S.C. 154(b) by 16 days.

(21) Appl. No.: 14/162,352

(22) Filed: Jan. 23, 2014

(65) Prior Publication Data

US 2014/0210609 A1 Jul. 31, 2014

(30) Foreign Application Priority Data

Jan. 25, 2013 (TW) .............................. 102102942 A

(51) Int. Cl.
*B60Q 1/22* (2006.01)
*B60Q 1/26* (2006.01)
*A42B 3/04* (2006.01)

(52) U.S. Cl.
CPC ............ *B60Q 1/2676* (2013.01); *A42B 3/0453* (2013.01)

(58) Field of Classification Search
CPC ..... B60Q 1/2676; A42B 3/0453; A42B 3/044
USPC ................. 340/463, 432, 815.45, 467; 2/422; 362/106
See application file for complete search history.

(56) References Cited

U.S. PATENT DOCUMENTS

| 4,559,516 | A | * | 12/1985 | Schott et al. ................... 340/475 |
| 4,901,210 | A | * | 2/1990 | Hanabusa ..................... 362/106 |
| 5,615,132 | A | | 3/1997 | Horton et al. |
| 6,686,837 | B2 | * | 2/2004 | Kim ............................... 340/479 |
| 7,221,263 | B2 | * | 5/2007 | Moore et al. ................... 340/427 |
| 8,334,762 | B2 | * | 12/2012 | Szeljack ......................... 340/475 |
| 8,807,778 | B1 | * | 8/2014 | Latchman et al. ............ 362/106 |
| 8,941,482 | B1 | * | 1/2015 | Gouverneur ................. 340/465 |
| 2007/0147027 | A1 | * | 6/2007 | Chuang ......................... 362/106 |
| 2010/0253501 | A1 | * | 10/2010 | Gibson ......................... 340/475 |

FOREIGN PATENT DOCUMENTS

| CN | 2696925 | 5/2005 |
| CN | 102135427 A | 7/2011 |
| TW | M299488 | 10/2006 |

(Continued)

*Primary Examiner* — Toan N Pham
(74) *Attorney, Agent, or Firm* — Muncy, Geissler, Olds & Lowe, P.C.

(57) ABSTRACT

A helmet apparatus for automated vehicle heading alert includes a carrier detachable from headwear of a driver, a plurality of light emitting elements, a gyroscopic device, a signal processing and decision-making (SPDM) processor, and a power device. The light emitting elements are installed on the carrier and include left and right light emitting elements. The gyroscopic device is installed on the carrier and includes a gyroscope for detecting an operation of a vehicle and outputting gyroscope signals corresponding to the operation. The SPDM processor receives the gyroscope signals to form operation signals, processes the operation signals, performs a discriminant decision-making procedure, generates consecutively discriminant signals corresponding to the operation signals, and drives accordingly at least one of the light emitting elements to turn on, turn off, or flashing. The power supply device is used for supplying power required by the light emitting elements, the gyroscopic device, and the SPDM processor.

20 Claims, 17 Drawing Sheets

(56) References Cited

FOREIGN PATENT DOCUMENTS

| | | |
|---|---|---|
| TW | 200815757 A | 4/2008 |
| TW | M351002 | 2/2009 |
| TW | M354128 | 4/2009 |
| TW | 201006707 A | 2/2010 |
| TW | I320702 | 2/2010 |
| TW | I320702 B | 2/2010 |
| TW | M381552 U | 6/2010 |
| TW | 201043160 A | 12/2010 |
| TW | 201106886 | 3/2011 |
| TW | M417024 U | 12/2011 |

* cited by examiner

Before calibration

After calibration

HELMET APPARATUS FOR AUTOMATED VEHICLE HEADING ALERT

CROSS-REFERENCES TO RELATED APPLICATIONS

This non-provisional application claims priority under 35 U.S.C. §119(a) on Patent Application No. 102102942 filed in Taiwan, R.O.C. on Jan. 25, 2013, the entire contents of which are hereby incorporated by reference.

BACKGROUND

1. Technical Field

The present invention relates to a drive-heading warning device, and in particular, to a helmet apparatus for automated vehicle heading alert capable of dynamically reflecting a traveling state of a vehicle and automatically generating a drive-heading warning for pedestrians and vehicles around.

2. Related Art

As those have been devised, automobiles or motorcycles are generally equipped with indicator lights which can produce actively visual warnings movement state of a vehicle. To be specified, the indicator lights are direction lights, brake lights, or other types of light having a warning function of the vehicles. In the classification, the direction light is used for indicating the vehicle-driving direction, and warning the other vehicles around to keep away a safe distance.

A conventional direction light is ordinarily controlled by the vehicle driver through switching a related mechanism on the vehicle, such as a toggle switch operated by hands or fingers, and, generally, the corresponding decision is usually made by the driver's brain. The visual warning, which is often provided by flash-light signals, can be classified into front-positioned ones and rear-positioned ones, and situated approximately at four corners of the vehicle body. For a crowded traffic, the indicator light of the vehicle is easily ignored by the vehicles around due to its relatively low position, and, in addition, the driver may be too nervous to forget the operation of the indicator light; therefore, there is a room for improvement.

The published Chinese patent CN2696925, entitled automatic warning device for speed reducing or steering of vehicle, provides an automatic warning device for speed reducing or steering of a vehicle. The device has guiding pipes with a proper inclination angle; inner portions of the guiding pipes are provided with conductive beads; an upper end surface of the guiding pipe is provided with a guiding post functioning as a switch. Each set of external wires of the guiding posts is connected to a third brake light arranged on the vehicle. An inertia force generated during sudden braking or steering of the vehicle drives the conductive beads to move and hence turn on the circuit and turn on the brake light. Moreover, Yang Shengxing in TW Patent No. M299488 in the year 2006, Lin Jiexing in TW Patent No. M351002 in the year 2008, and Luo Jianming and Shi Zhihao in TW Patent No. M354128 in the year 2008 each similarly provide a warning helmet used for vehicles, in which by means of a wireless receiver for receiving signals, switching signals for a direction light or brake light can be synchronously transmitted to a receiver and a circuit control module on the safety helmet in a wireless manner, thereby controlling the direction light and brake light set on the safety helmet.

The U.S. Pat. No. 5,615,132, granted in 1997 to Horton and Newton and entitled method and apparatus for determining position and orientation of a movable object using accelerometers, and the TW invention patent I320702 in the year 2010, invented by Lu Shudong, et al. and entitled method for dynamically providing direction signal and safety helmet using same, both provide a safety helmet capable of providing position or direction signals, which reflects a left or right inclination action of a user or a speed change into signals by using an accelerometer. The patent invented by Horton and Newton is mainly used in application of virtual reality, and the patent invented by Lu Shudong, et al. is used for actuating a driving light set, but the sensing principle thereof is mainly based on an acceleration change rather than an angular speed displacement change of a gyroscopic device.

In the published TW patent TW201106886, entitled safety helmet with indicator light and direction indicating method using the safety helmet, the direction indicating method using the helmet includes detecting, by using a detection device, time it takes for a main body that has turned leftward or rightward for an angle to return to an original position, and when the time reaches a preset value, driving the left light or the right light to emit light for a preset period of time. This technology mainly detects an action of the head of a user and the duration of the action, and thereby turns on a corresponding indicator light device. However, in practice, a vehicle driver wearing a helmet usually observes the situation behind at left and right sides through left and right review mirrors, and inevitably turns the head to the left or right during the observation. Therefore, in the method provided in this published patent, misoperations occur easily, in which a user action of looking at the left or right review mirror is taken by mistake as a left turning or right turning operation and thus the left light or right light is driven to limit light.

To date, the conventional design for direction lights on a helmet are, in principle, actuated directly through a direct ON/OFF operation or a decision calculation based on a physical measurement of sensors, such as inclination sensor or accelerometer. However, the inexact employment of sensory methodology is basically prone to noise interference with the highly vibrational vehicles on an uneven road surface.

Therefore, how to provide an effective direction detection which can exactly indicate the direction of a moving vehicle is an urgent issue to be solved by the inventor of the present invention.

SUMMARY

Accordingly, the present invention provides a helmet apparatus for automated vehicle heading alert, which includes a carrier detachable from headwear of a driver; a plurality of light emitting elements, installed on the carrier and including a left light emitting element and a right light emitting element; a gyroscopic device, installed on the carrier and at least including a gyroscope, used for detecting an operation of a vehicle and outputting a series of gyroscope signals corresponding to the operation; a signal-processing and decision-making (SPDM) processor which receives the gyroscope signals to form a series of operation signals, processes the operation signals, performs a discriminant decision-making procedure, generates consecutively discriminant signals corresponding to the operation signals, and drives accordingly at least one of the right light emitting element and the left light emitting element to turn on, turn off, or flashing; and a power supply device, used for supplying power required by the light emitting elements, the gyroscopic device, and the SPDM processor.

In one implementation aspect, the carrier is attached to the headwear through at least one of a magnet, a fastening member, and a velcro tape.

In one implementation aspect, the gyroscope is biaxial or triaxial.

In one implementation aspect, the gyroscopic device detects angular changes of a turning of the vehicle.

In one implementation aspect, the SPDM processor acquires the angular changes to form operation signals, and compares elementarily at least an absolute value of an angular change in an operation signal with a set value where the operation signal comprises the gyroscope signal of the angular change. The SPDM processor generates, based on the comparison, an elementarily discriminant signal to activate either the left light emitting element or the right light emitting element, which depends basically on whether the angular change is a positive or a negative value respectively, when the angular change is greater than the set value.

In one implementation aspect, the gyroscopic device includes a signal modulator used for modulating the original signals in an analog form into the signals in a digital form.

In one implementation aspect, the set value can be a fixed threshold, a scalable value correlated with the scale of the angular change in the gyroscopic device, or a scalable value correlated with the scale of the speed change in the acceleration sensor unit.

In one implementation aspect, the helmet apparatus for automated vehicle heading alert further includes a middle light emitting element and an acceleration sensor unit, the acceleration sensor unit is installed on the carrier and at least includes one accelerometer, used for detecting acceleration changes of the vehicle and outputting a series of acceleration signals, the SPDM processor generates the discriminant signal by estimating and approximating the levels of the acceleration signals and drives the middle light emitting element, according to the discriminant signal, to turn on, turn off, or activate different levels of light to reflect different operations of the vehicle.

In one implementation aspect, the accelerometer is biaxial or triaxial.

In one implementation aspect, the SPDM processor determines the luminance of the middle light emitting element according to the acceleration signal, the luminance of the middle light emitting element is proportional to the acceleration change of the vehicle.

In one implementation aspect, the SPDM processor compares elementarily at least an initial speed change or one of the operation signals with a first set value or a second set value, respectively, and the SPDM processor generates, based on the comparison, an elementarily discriminant signal to activate the middle light emitting element.

In one implementation aspect, the first set value and the second set value can be fixed thresholds, or scalable values correlated with the scale of the speed change in the acceleration sensor unit.

In one implementation aspect, the discriminant decision-making procedures and corresponding consequent discriminant signals to activate the left or right light emitting element and the middle light emitting element can be either compounded into integrated ones or individually separated as standalone ones.

In one implementation aspect, the SPDM processor includes a digital signal processing and filtering unit and a discrimination and processing unit. The digital signal processing and filtering unit is used for performing filtering processing on the operation signal. The discrimination and processing unit includes a memory, a logic operation processor, and an input/output (I/O) port. The left light emitting element and the right light emitting element are electrically connected to the I/O port. The memory has the discriminant decision-making procedure therein, used for generating the discriminant signals and driving accordingly at least one of the light emitting elements through the I/O port.

In one implementation aspect, the helmet apparatus for automated vehicle heading alert includes: a first auxiliary sensor unit, which includes at least two accelerometers, used for detecting an operation of the vehicle, outputting a series of first auxiliary signals, and delivering the first auxiliary signals together with the operation signals to the SPDM processor, the SPDM processor is allowed to process and discriminate the operation signals only when directions along a first principal axis of instantaneous acceleration sensed by the two accelerometers are the same, and the SPDM processor generates the corresponding discriminant signal.

In one implementation aspect, the two accelerometers are separately installed at two sides of the headwear, the two sides are divided by an axis which passes through the center of the head of the wearer and aligns to the traveling direction of the vehicle.

In one implementation aspect, the helmet apparatus for automated vehicle heading alert includes: a second auxiliary sensor unit, which at least includes an accelerometer or a magnetometer, used for detecting an operation of the vehicle, outputting a series of second auxiliary signals, and delivering the second auxiliary signals together with the operation signals to the SPDM processor, to calibrate bias of the gyroscopic device caused by a gyroscope drift.

In one implementation aspect, the helmet apparatus for automated vehicle heading alert further includes: a principal coordinate system calibration procedure performed by the SPDM processor. The principal axis of the principal coordinate system aligned to the instantaneous vehicle traveling direction by means of coordinate system transformation from a reference coordinate system. The principal coordinate system calibration procedure is used to map every axes in the sensing components disposed at the carrier, such as the gyroscopic device, the acceleration sensor unit, the first auxiliary sensor unit and the second auxiliary sensor unit, exactly to the defined principal axes to overcome the difficulty once the signals are measured under an ill-alignment between the sensor coordinate (the reference coordinate) and the movement coordinate (the principal axis coordinate) which may be caused by an inexact wearing of the helmet or an inexact installation of the sensory devices.

In one implementation aspect, the power supply device can be a primary cell, a rechargeable cell with a charging mechanism, a solar cell, or can be connected to a power source of the vehicle through power lines and electric connectors, which directly uses power from the vehicle.

The detailed features and advantages of the present invention are described below in great detail through the following embodiments, and the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
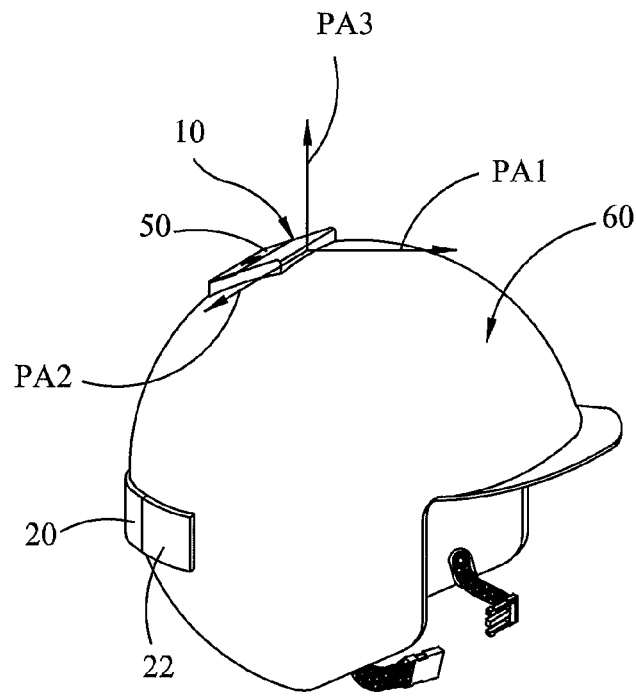
FIG. 1 is a schematic structural diagram of a helmet capable of indicating a driving direction according to an embodiment of the present invention.
Figure 2:
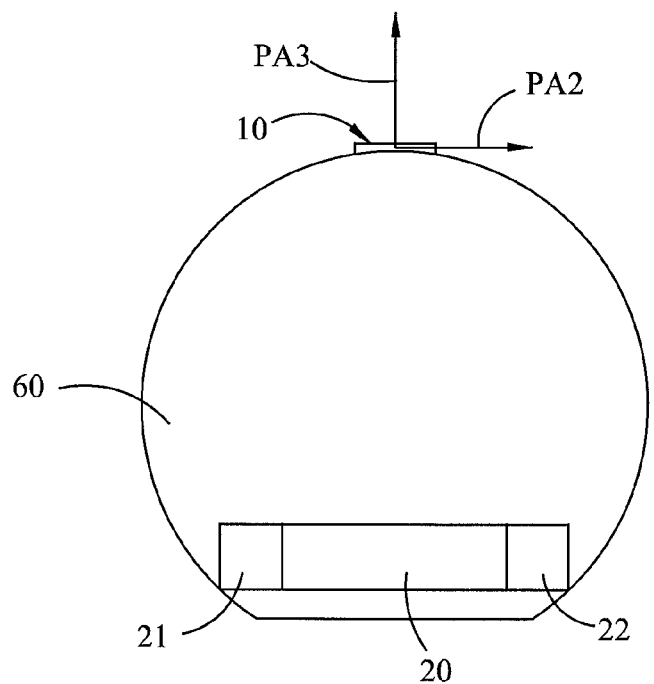
FIG. 2 is a back view of FIG. 1.
Figure 3:
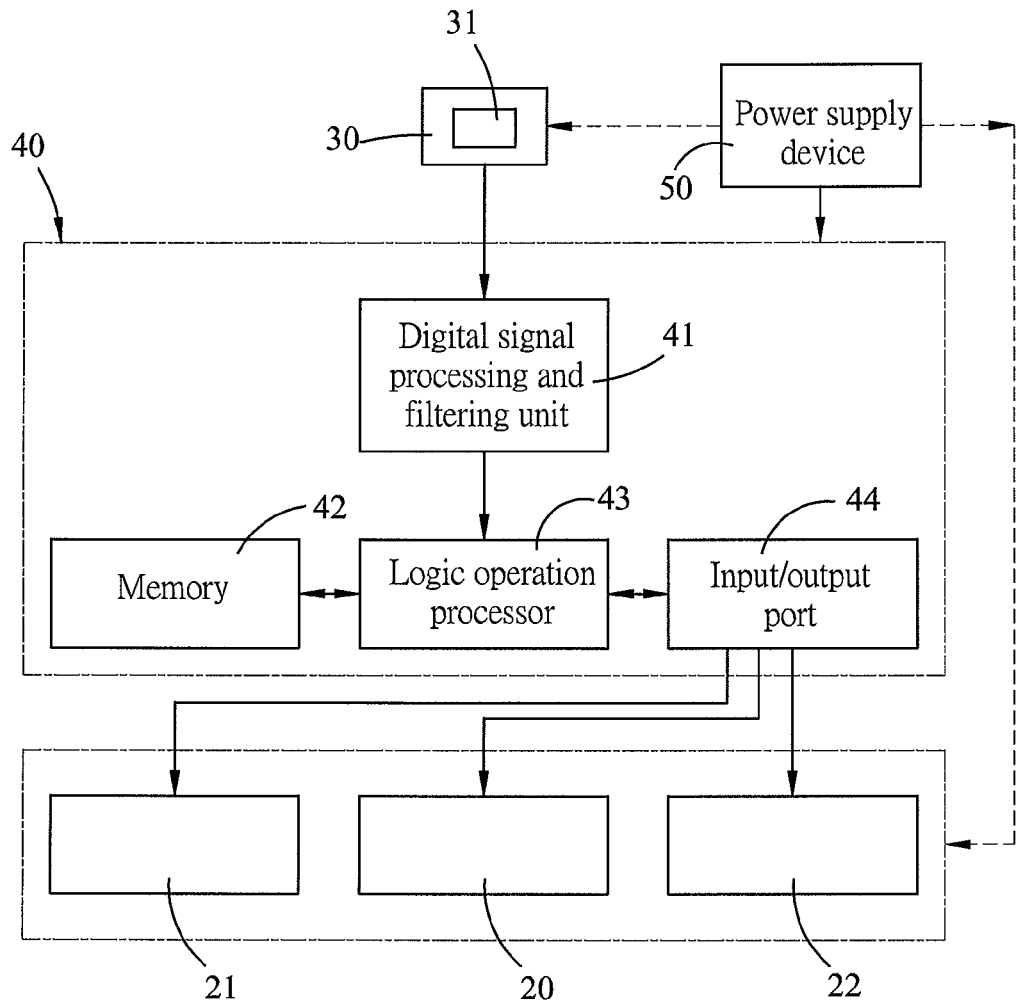
FIG. 3 is a functional block diagram of an embodiment of the present invention.

Together with significant portions which have been numerically labeled, FIG. 1 and FIG. 2 illustrate elementarily a helmet capable of indicating a drive-heading status according to an embodiment of the present invention. FIG. 3 is the functional block diagram of an embodiment of the present invention. Referring to these figures, the embodiment of the present invention includes:

a carrier 10 detachable from headwear of a driver, the headwear can be a helmet, or other similar objects, where in an embodiment shown in FIG. 1, but cannot be limited to a safety helmet 60, the carrier 10 is a casing, and can be attached to the headwear through, for example, a magnet, a fastening member, a velcro tape, or other similar means;

a plurality of light emitting elements, installed on the carrier 10, and including a left light emitting element 21 used for indicating a left turning operation and a right light emitting element 22 used for indicating a right turning operation;

a gyroscopic device 30 (see FIG. 3), installed on the carrier 10, where the gyroscopic device 30 at least includes a gyroscope 31, used for detecting an operation of a vehicle and outputting operation signals corresponding to the operation;

a signal-processing and decision-making (SPDM) processor 40 which receives the operation signals, processes the operation signals, performs a discriminant decision-making procedure, generates the corresponding discriminant signals to drive either the left light emitting element 21 or the right light emitting element 22 to operate (including turning on, turning off, or flashing), to indicate the vehicle turning operations; and a power supply device 50, used for supplying power required by the plurality of light emitting elements, the gyroscopic device 30, and the SPDM processor 40.

Figure 4:
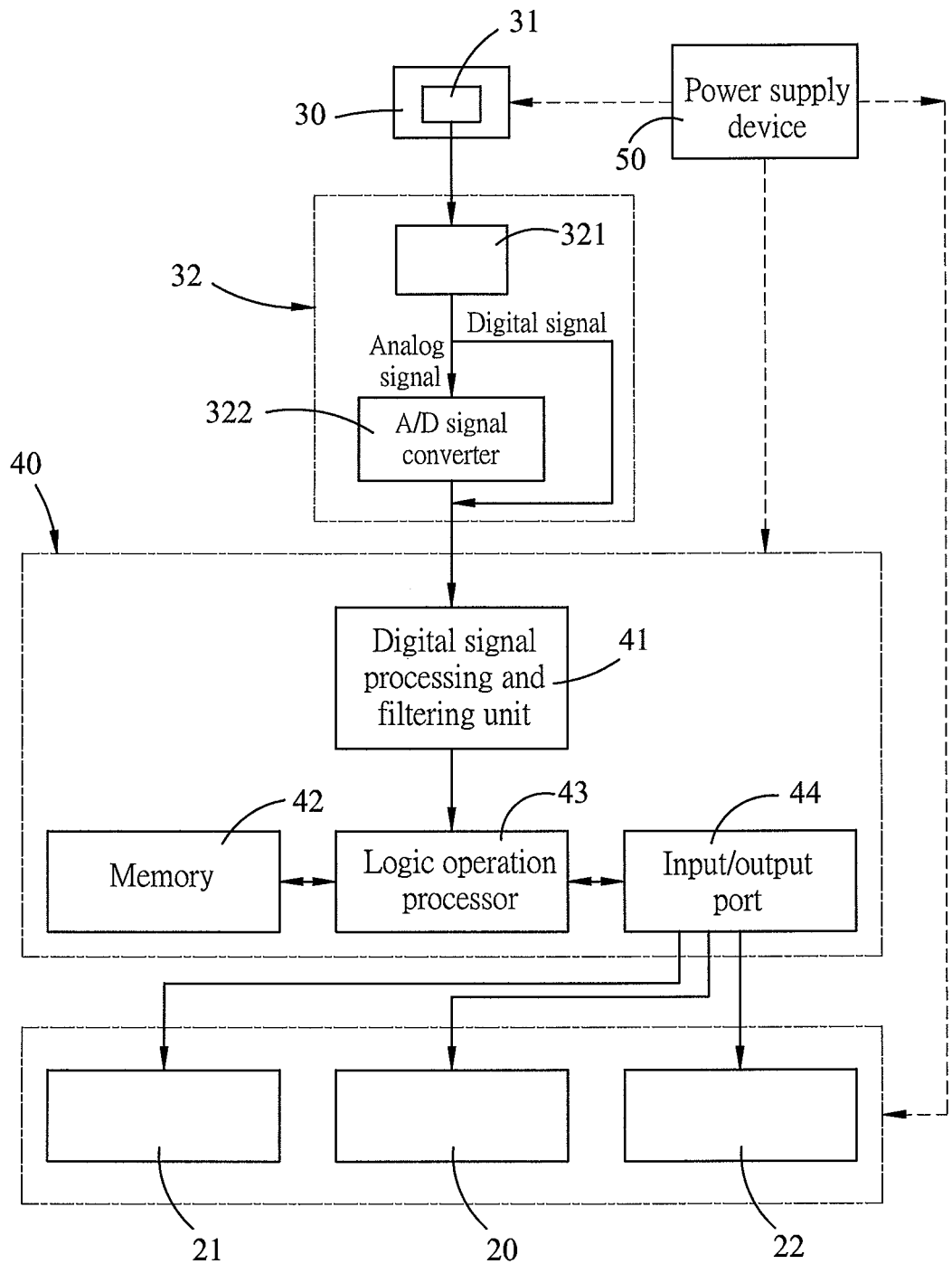
FIG. 4 is a functional block diagram of another embodiment of the present invention, which includes a signal modulator.

According to an embodiment of the present invention, the gyroscope 31 in the gyroscopic device 30 may be a biaxial or triaxial gyroscope, which can be installed at any position of the headwear through the carrier 10. In the following embodiments of the present invention, the safety helmet 60 is used as an example of the headwear, but the headwear is not limited thereto. The gyroscope 31 in the gyroscopic device 30 continuously samples angular displacements of a vehicle turning during the turning of a vehicle, and generates a series of original gyroscope signals to form a series of operation signals containing consecutive angular changes. When the original operation signals are analog signals, the gyroscope 31 needs to be modulated with a signal modulator 32 (see FIG. 4), where the signal modulator 32 modulates the original operation signals into digital operation signals and outputs the digital operation signals, which would be compatible to the subsequent processes by the SPDM processor 40.

According to an embodiment of the present invention, the signal modulator 32 includes:

a bridge conditioning unit 321, which is a signal conditioner electrically connected to the gyroscope 31 in the gyroscopic device 30 for manipulating the original operation signal generated by the gyroscope 31 into a signal met the requirement of the next stage in a digital or analog form; and an analog-to-digital converter (A/D converter) 322 that converts the input signal in an analog form into that in a digital form if necessary; generally, the bridge conditioning unit 321 is a circuit and/or an electronic assembly matching the specifications and features of the adopted gyroscopic device 30, so after being conditioned by the bridge conditioning unit 321, the input signal may be in a digital form or an analog form; if they are in an analog form, they need to be converted into a digital form by the A/D converter 322, so as to be processed subsequently; in other words, the A/D converter 322 may be optionally used as required, and is used for converting an analog signal into its corresponding digital signal if necessary.

Figure 5:
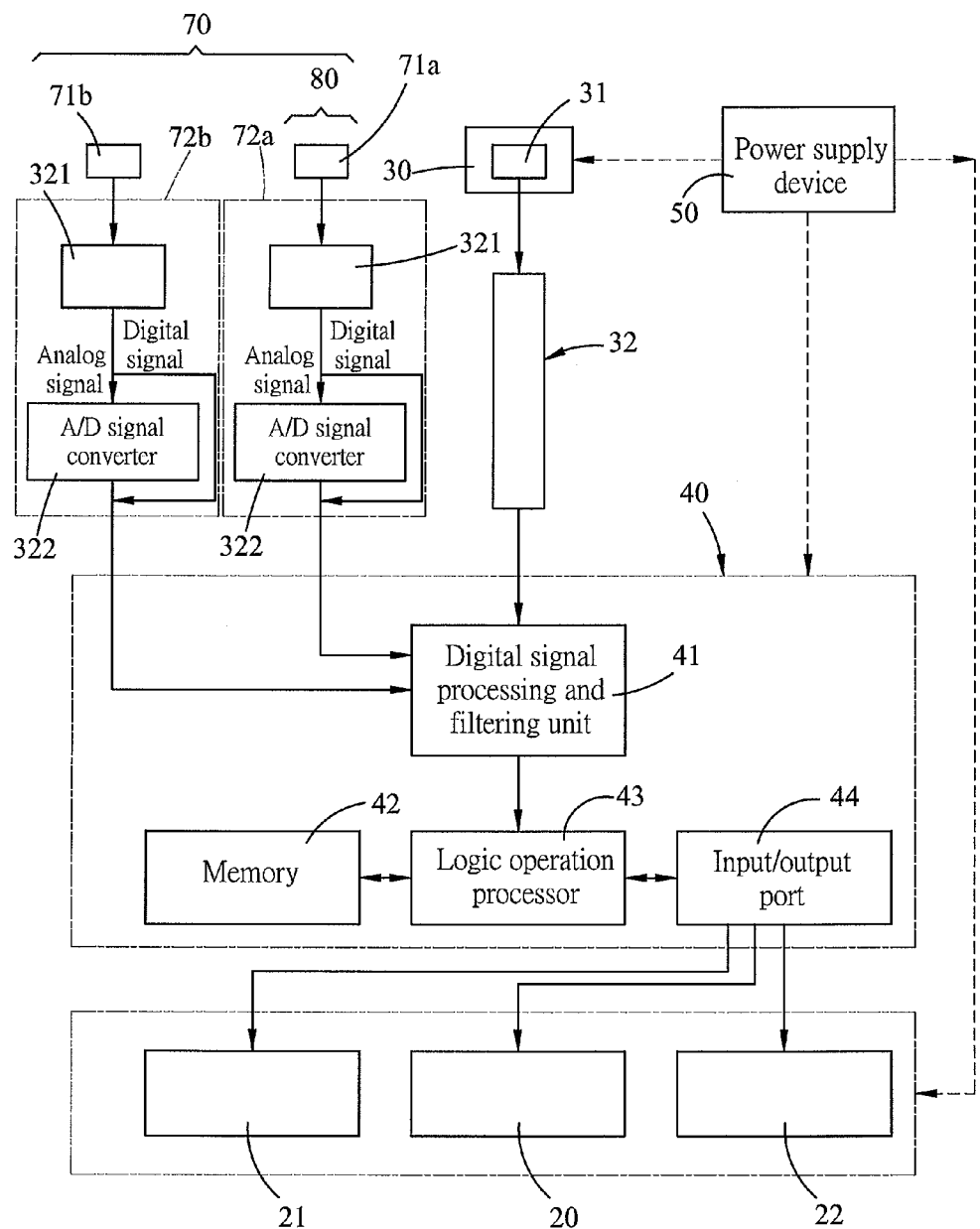
FIG. 5 is a functional block diagram of another embodiment of the present invention, which includes a first auxiliary sensor unit.

To distinguish a head turning action of a user from a vehicular turning movement of a running vehicle, an embodiment of the present invention includes a first auxiliary sensor unit 70 (see FIG. 5). The first auxiliary sensor unit 70 has at least two accelerometers 71a and 71b; the two accelerometers 71a and 71b are separately installed at two sides of the helmet 60, the two sides being divided are defined by an axis which passes through the center of the wearer's head and directs to the traveling direction of the vehicle; the installation positions are not necessarily symmetric. The two accelerometers 71a and 71b sense individually accelerations during a turning movement, generate a series of first auxiliary signals, and transmit the first auxiliary signals together with the simultaneous operation signals to the SPDM processor 40, to assist the SPDM processor 40 in distinguishing a head or body turning action of a driver from a vehicular turning movement of the vehicle, so as to prevent a misoperation.

Figure 6A:
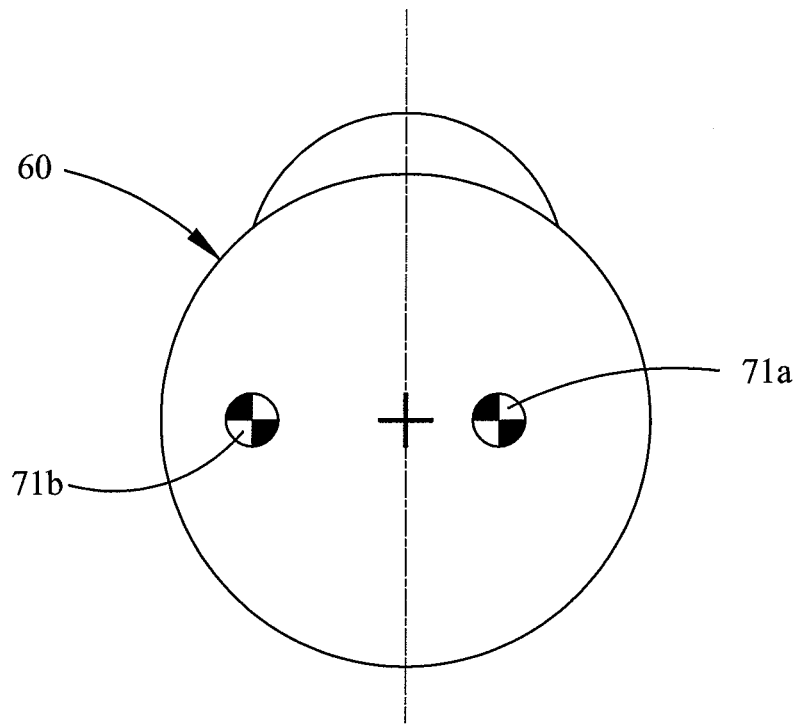
FIG. 6A is a partial structural diagram of an embodiment of the present invention, which shows the installation positions of two accelerometers of the first auxiliary sensor unit.
Figure 6B:
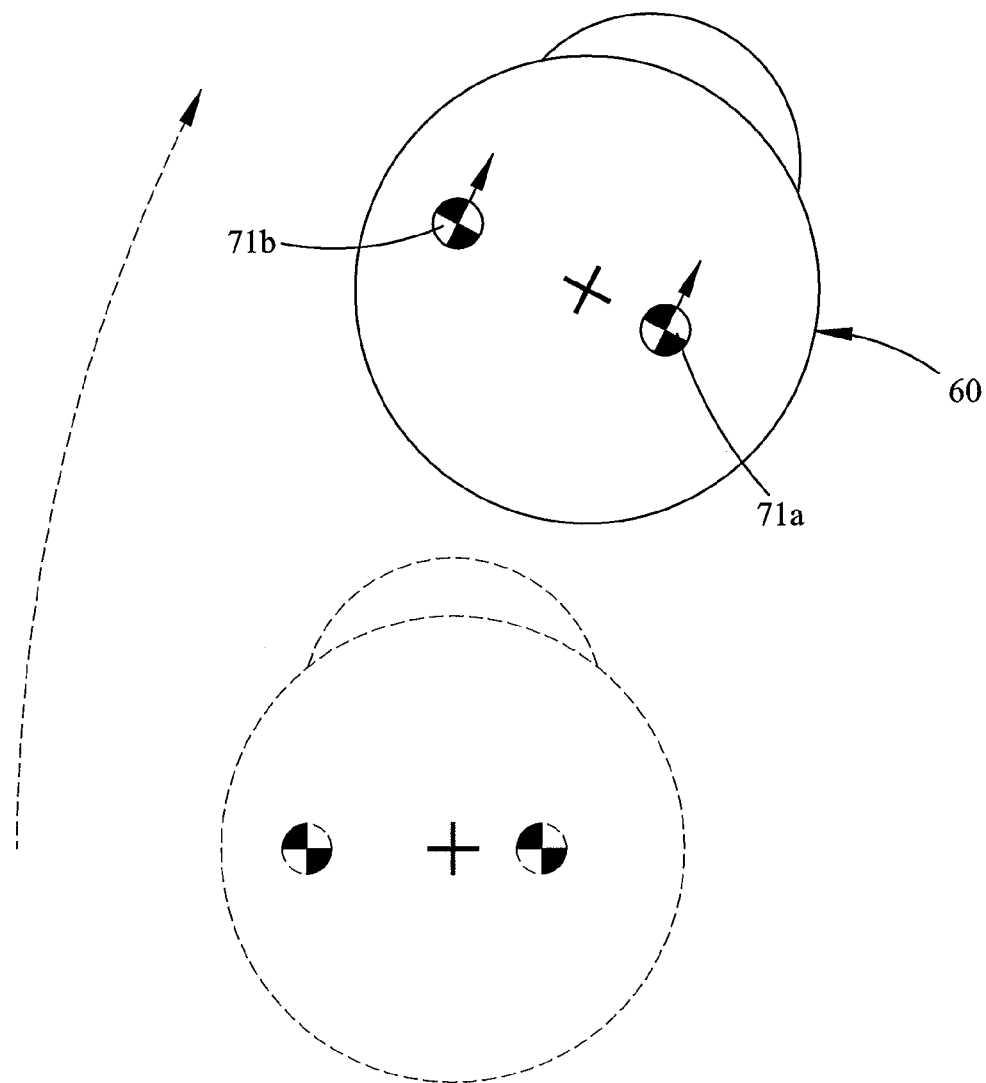
FIG. 6B is an operational schematic diagram, which shows the same instantaneous acceleration direction of the two accelerometers along the first principal axis in a first auxiliary sensor unit during a vehicle turning.
Figure 6C:
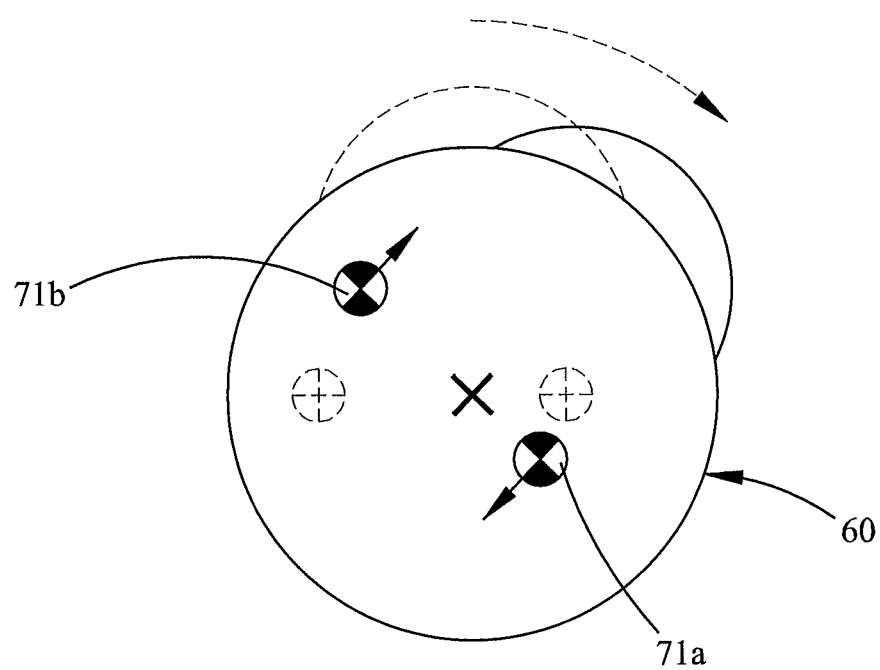
FIG. 6C is an operational schematic diagram, which shows the opposite instantaneous acceleration directions of the two accelerometers along the first principal axis in a first auxiliary sensor unit during a turning of the driver's head or body.

FIG. 6A shows an embodiment of the present invention, in which two separated accelerometers 71a and 71b in use are symmetrically or asymmetrically installed at two sides of the safety helmet 60. If the helmet moves consistently with a vehicular turning, both of the directions of instantaneous acceleration along a first principal axis sensed by the accelerometers 71a and 71b, which have been arranged oppositely at the two sides, will be the same, as shown in FIG. 6B; while the directions will be opposite if the helmet moves only along the wearer's head or body turning, as shown in FIG. 6C.

Figure 7:
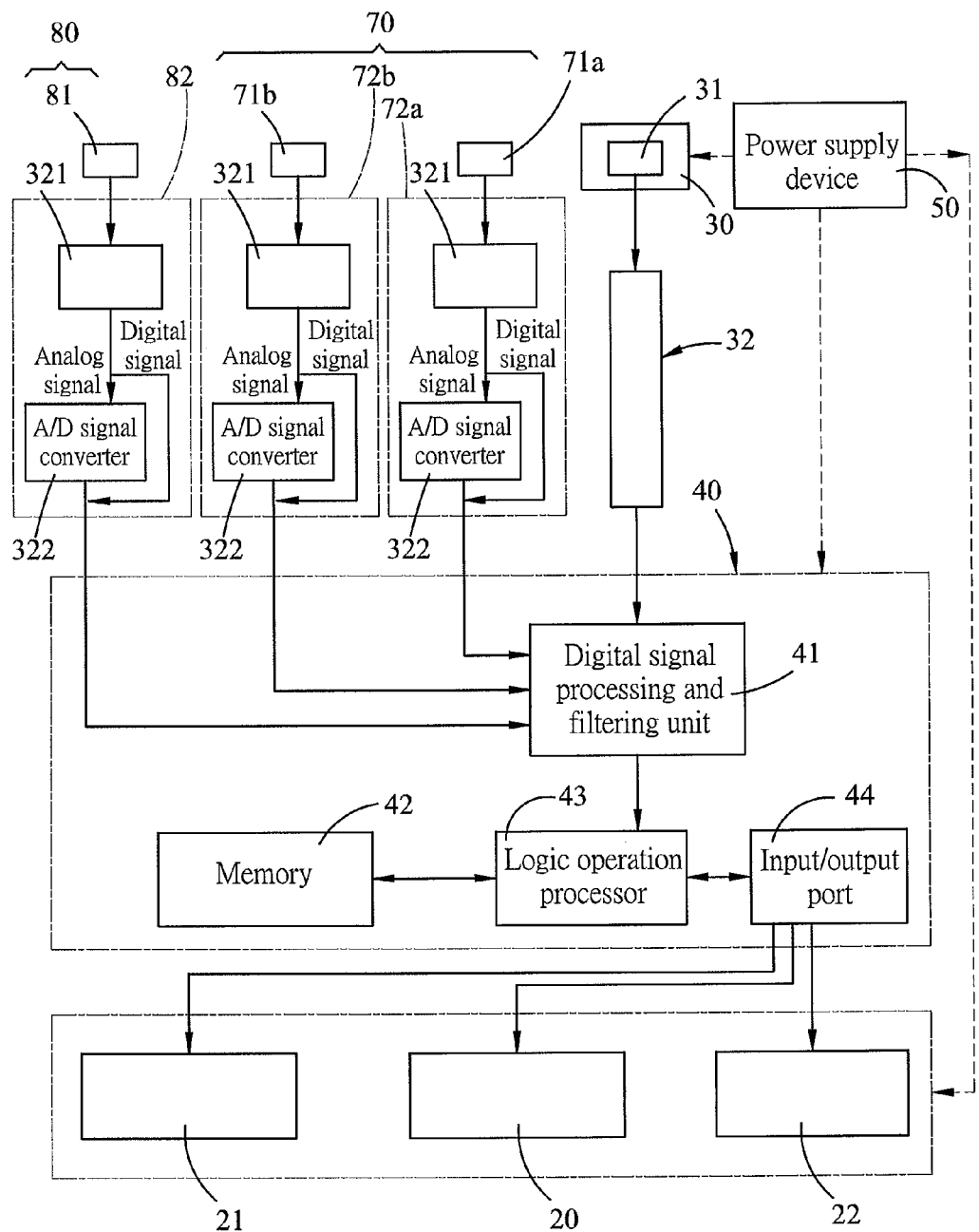
FIG. 7 is a functional block diagram of another embodiment of the present invention, which includes a first auxiliary sensor unit and a second auxiliary sensor unit.

In an embodiment of the present invention, the helmet apparatus for automated vehicle heading alert includes a second auxiliary sensor unit 80, used to calibrate bias of the gyroscopic device 30 caused by a gyroscope drift. An embodiment of the second auxiliary sensor unit 80 according to the present invention for eliminating the bias at least includes an accelerometer 71a (as shown in FIG. 5) or a magnetometer 81 (as shown in FIG. 7), used for detecting an operation of the vehicle, outputting a series of second auxiliary signals, and delivering the second auxiliary signals together with the simultaneous operation signals to the SPDM processor 40, to calibrate the bias of the gyroscopic device 30 caused by the gyroscope drift.

Figure 8:
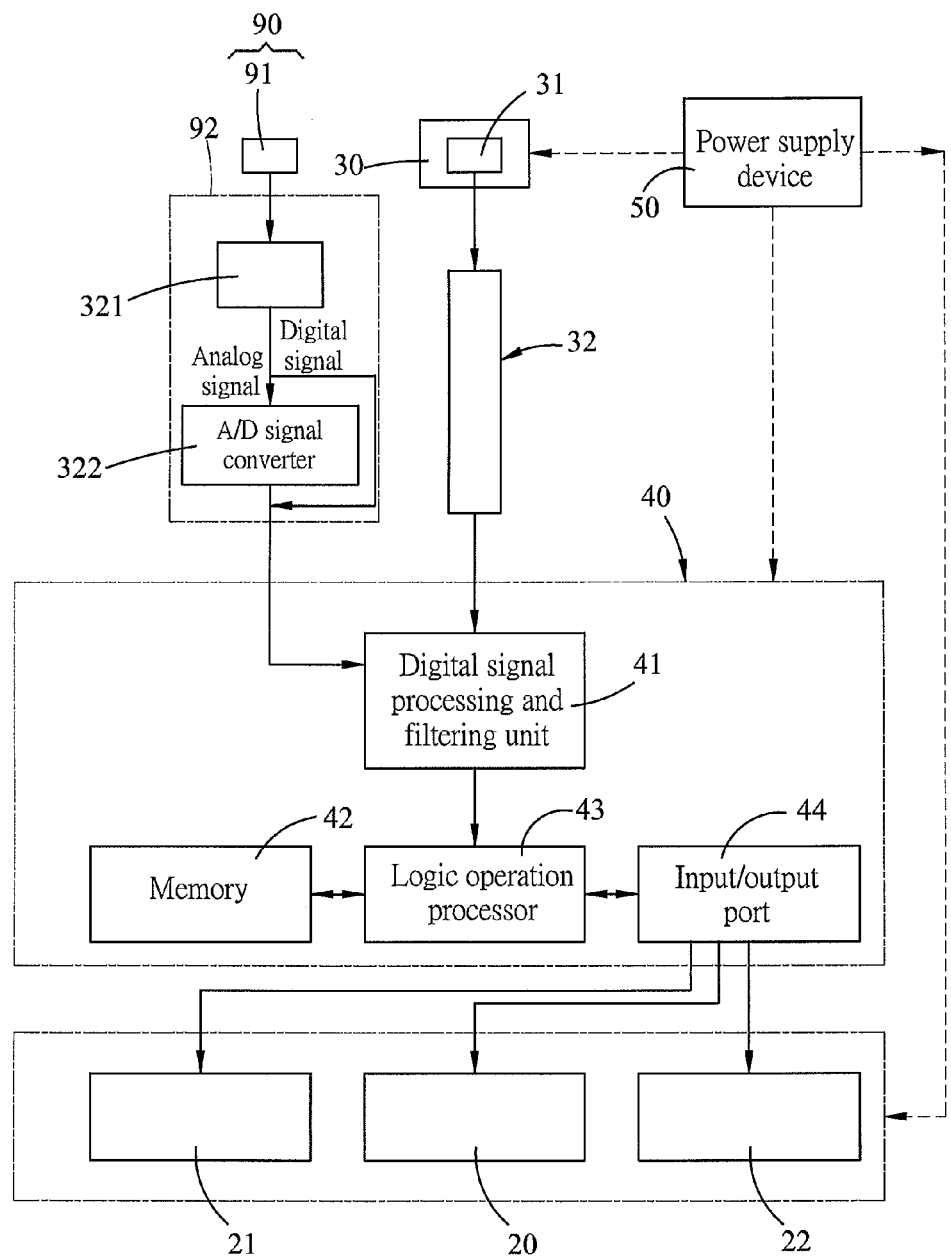
FIG. 8 is a functional block diagram of another embodiment of the present invention, which includes an acceleration sensor unit.

In an embodiment of the present invention, the helmet apparatus for automated vehicle heading alert includes a middle light emitting element 20 used for indicating a braking operation, and an acceleration sensor unit 90. As shown in FIG. 8, the acceleration sensor unit 90 includes at least one accelerometer 91, used for detecting an acceleration change of the vehicle and outputting a series of acceleration signals; the SPDM processor 40 generates an instantaneous discriminant signal by estimating and approximating the levels of the instantaneous acceleration signals to drive the middle light emitting element 20 to turn on, turn off, or activate different levels of light to reflect the level of the acceleration change, thereby warning about the braking operation of the vehicle.

In an embodiment of the present invention, the operation signals which are enumerated to feed to the SPDM processor 40 as the inputs include the corresponding gyroscope signals acquired by the gyroscopic device 30 at least. With an additional acceleration sensor unit, the operation signals can further include the corresponding acceleration signals acquired by the acceleration sensor unit 90.

In an embodiment of the present invention, the SPDM processor 40 generates the discriminant signal according to the acceleration signal. The luminance of the middle light emitting element 20, according to the discriminant signal, is hence positively proportional to the acceleration change. It means the discriminant signal drives the middle light emitting element 20 to illuminate various levels of light according to the strength of the braking operation. The positively proportional relationship between the acceleration level and the luminance level can be manipulated by a key-value-pair mapping, a look-up table, a hash table, or a direct computation from an approximated function in the SPDM processor 40.

According to an embodiment of the present invention, sensing elements (including accelerometers and magnetometers) in the first auxiliary sensor unit 70, the second auxiliary sensor unit 80, and the acceleration sensor unit 90 sometimes need to be modulated with signal modulators, which are shown as signal modulators 72a and 72b, a signal modulator 82, and a signal modulator 92 as shown in FIGS. 5, 7, and 8; the structures thereof are similar to that in the foregoing signal modulator 32. In other words, when original auxiliary signals generated by the accelerometer or magnetometer are analog signals, the analog signals can be modulated into their corresponding signals in a digital form by the signal modulators.

The modulators 72a, 72b, 82, and 92 are not necessarily independent units according to circuit design thereof; in application, the signal modulators can be integrated together with the signal modulator 32 of gyroscopic device 30 thereto to form a circuit configuration, which is used to convert the operation signals, which include optionally the simultaneous gyroscope signals and acceleration signals, the optional first auxiliary signals, and the optional second auxiliary signals, in their original analog form into those in digital form, so as to be processed by the SPDM processor 40 subsequently.

In another embodiment of the present invention, if the first auxiliary sensor unit 70, the second auxiliary sensor unit 80, and the acceleration sensor unit 90 can use the same sensing element, for example but not limited thereto, an accelerometer, which means an element-shared structure can be applied in this case. For example, the accelerometer 71a in the acceleration sensor unit 90 and the accelerometer 71a in the first auxiliary sensor unit 70 can be a shared one (see FIG. 5).

According to an embodiment of the present invention, as shown in FIG. 3, the SPDM processor 40 includes:

a digital signal processing and filtering unit 41, used for performing filter processing on the digital gyroscope signal, digital first auxiliary signal, digital second auxiliary signal, and digital acceleration signal outputs by the gyroscopic device 30, the first auxiliary sensor unit 70, the second auxiliary sensor unit 80, and the acceleration sensor unit 90, respectively, and also performing angular integration on the gyroscope signal outputs from the gyroscopic device 30, and calibrating drift bias thereof accumulated with time in the gyroscopic device 30; and a discrimination and processing unit, which includes a memory 42 (including either of an erasable memory and a non-erasable memory), a logic operation processor 43 (namely, a CPU), and an input/output (I/O) port 44, where the left light emitting element 21, the middle light emitting element 20, and the right light emitting element 22 are electrically connected to the I/O port 44, the memory 42 has a discriminant decision-making procedure therein, and is capable of processing the operation signals, generating the discriminant signal after a discriminant analysis, and driving, according to the discriminant signal, the left light emitting element 21, the middle light emitting element 20, and the right light emitting element 22 through the I/O port 44 to operate properly.

The headwear is not limited to the safety helmet 60, as long as it can be worn on the head of the user. Through the detachability, all the related components like the gyroscopic device 30, the first auxiliary sensor unit 70, the second auxiliary sensor unit 80, the acceleration sensor unit 90, the SPDM processor 40, and the power supply device 50 can be installed onto the headwear not only by a single carrier 10 but also by a plurality of separated carriers 10.

The power supply device 50 supplies sufficient power by using a cell (which may be a primary cell or a rechargeable cell), for implementation thereof, it can be any kind of a general cell, a rechargeable cell with a charging mechanism, or a solar cell. In the other implementation case, it directly uses power from the vehicle through a structure of power lines and electric connectors.

The light emitting element may be, but is not limited to a light emitting diode (LED), a conventional bulb, or other light emitting elements. In a structure according to an embodiment of the present invention, the left light emitting element 21, the middle light emitting element 20, and the right light emitting element 22 are designed to be separated from one another, but the present invention is not limited to this embodiment. In a structure according to another embodiment, the left light emitting element 21, the middle light emitting element 20, and the right light emitting element 22 can also be integrated together.

Figure 9:
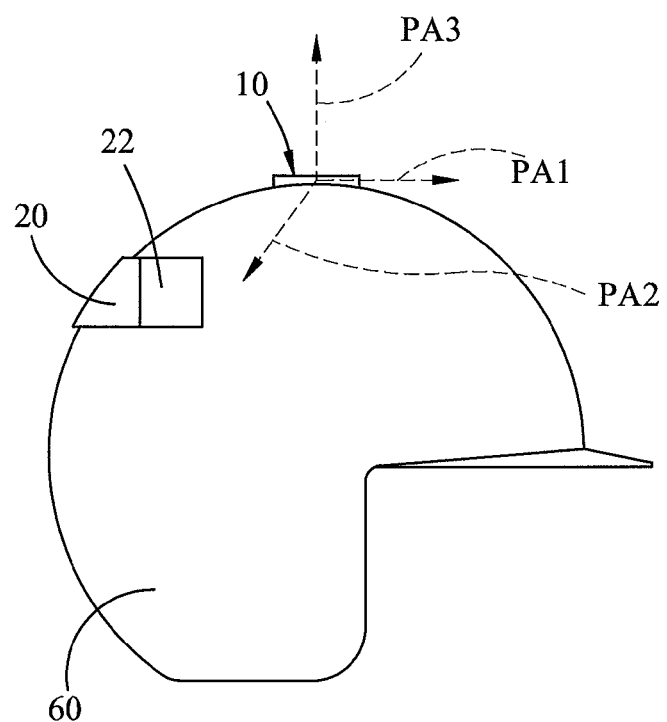
FIG. 9 is a schematic diagram showing the first kind of position configuration of the carrier in a helmet according to an embodiment of the present invention.
Figure 10:
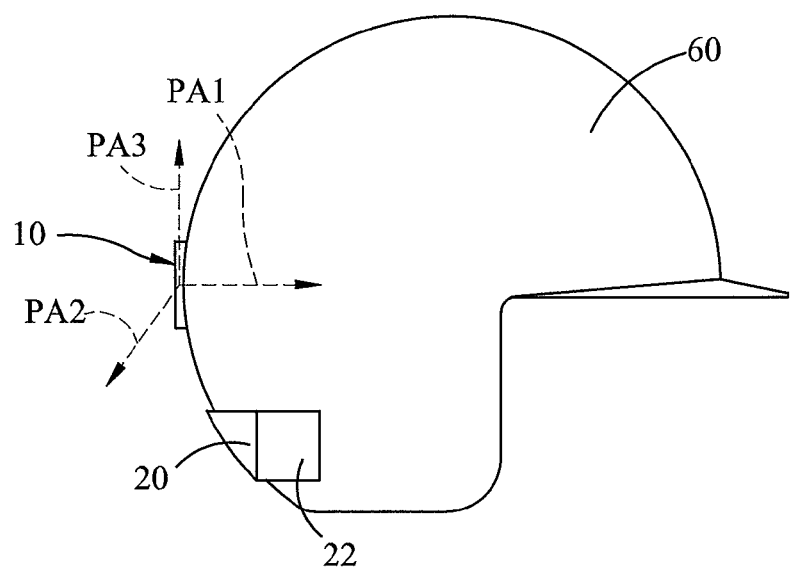
FIG. 10 is a schematic diagram showing the second kind of position configuration of the carrier in a helmet according to an embodiment of the present invention.
Figure 11:
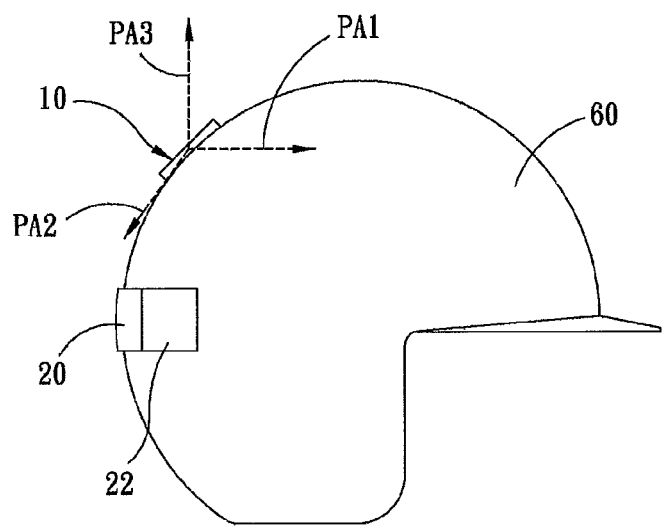
FIG. 11 is a schematic diagram showing the third kind of position configuration of the carrier in a helmet according to an embodiment of the present invention.

In a structure according to an embodiment of the present invention, the carrier 10 may be installed at any position on the safety helmet 60. As shown in FIG. 9, FIG. 10, and FIG. 11, the carrier 10 may be installed at a top position of the safety helmet 60 (see FIG. 9), installed at a rear position of the safety helmet 60 (see FIG. 10), or installed at a rear position on the top of the safety helmet 60 with an inclination (see FIG. 11). According to an embodiment of the present invention, the installation positions of the left light emitting element 21, the middle light emitting element 20, and the right light emitting element 22 on the safety helmet 60 may also vary, as shown in FIG. 9, FIG. 10, and FIG. 11, as long as the people surrounded can be noticeably alerted by the light emitting state of the left light emitting element 21, the middle light emitting element 20, and the right light emitting element 22 when they are activated. In a normal state, all the light emitting elements 21, 22, and 23 do not emit light. When the vehicle turns left, the left light emitting element 21 is activated to turn on or flash accordingly. When the vehicle turns right, the right light emitting element 22 is activated to turn on or flash accordingly. And, the middle light emitting element 20 is activated to turn on and illuminate properly certain level of light for a visual warning when the vehicle brakes and slows down.

In an embodiment of the present invention, the helmet apparatus for automated vehicle heading alert further includes a principal coordinate system calibration procedure, which is performed by the SPDM processor 40. The principal axis of the principal coordinate system aligned to the instantaneous vehicle traveling direction by means of coordinate system transformation from a reference coordinate system, the principal coordinate system calibration procedure is used to overcome the difficulty if the signals measured under an ill-alignment between the sensor coordinate (the reference coordinate) and the movement coordinate (the principal axis coordinate) which may be caused by an inexact wearing of the helmet or an inexact installation of the sensors, namely the gyroscope, the accelerometers, and the magnetometer.

According to an embodiment of the present invention, the gyroscope 31 in the gyroscopic device 30, the two accelerometers 71a and 71b and the accelerometer 91, installed on the carrier 10, are not necessarily aligned to the axis of the vehicle traveling direction, but the virtual first principal axis, which is generated thereafter the rotational coordinate system transformation, shall be aligned to the vehicle traveling direction.

According to an embodiment of the present invention, the measurement of sensory signals, for example but not limited thereto, the gyroscope signals or the acceleration signals, have to refer to a motion coordinate system consistent with the vehicle traveling direction, it is the reason a principal axis system has to be generated. Using a triaxial gyroscope 31 as an example, the principal axis system is shown in FIG. 1, which includes a first principal axis PA1, a second principal axis PA2, and a third principal axis PA3; the principal axis system is a reference coordinate system which defines the first principal axis PA1 to be consistent with the vehicle traveling direction. FIG. 9 and FIG. 10 show embodiments where three sensing axes are individually consistent with the axes in the reference coordinate, so the angular changes can be directly manipulated, but FIG. 11 shows an embodiment inconsistent, so it needs further a coordinate system transformation to obtain a principal axis system.

In general, the user worn safety helmet 60 does occasionally not well aligned to the principal axis system; the ill-alignment differs from user to user due to different wearing angles of the safety helmet 60. If the sensing axes of the gyroscope 31, the two accelerometers 71a and 71b or the accelerometer 91, installed on the carrier 10, do not exactly aligned to the principal axis coordinate system, a calibration procedure by means of a rotation matrix coordinate transformation is employed thereafter to map the sensing signals to the defined principal axis. The rotation matrix coordinate transformation can be implemented by means of a matrix algebra or the quaternions.

Figure 12:
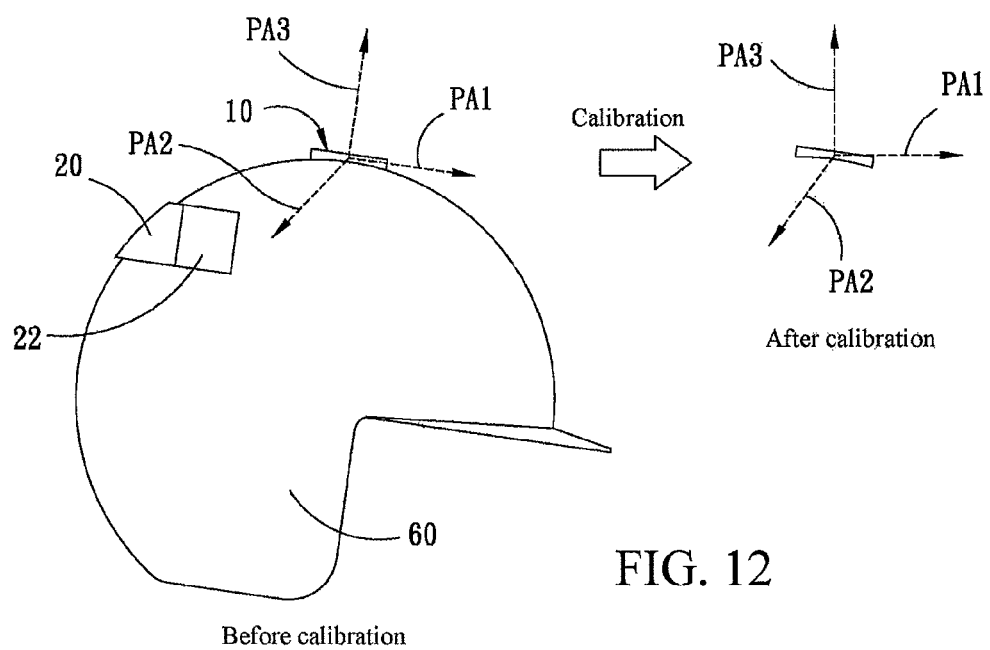
FIG. 12 is a schematic diagram showing the principal coordinate system calibration of a helmet according to an embodiment of the present invention.

FIG. 12 shows an application example of the present invention. Assuming that a user worn safety helmet 60 renders the first principal axis PA1 of the carrier 10 slightly inclined downward by an angle (as shown in the left side of FIG. 12, which is a situation before calibration) and hence ill-aligned with the vehicle traveling direction, it produces a bias in the direction of the first principal axis PA1 of the carrier 10 when the vehicle moves, such as makes a turn or changes the speed, and may cause the discriminant decision-making procedure an ill reaction. To solve this problem, an embodiment of the present invention further includes an initial calibration procedure; the user may start the SPDM processor 40 to perform an initial calibration procedure; through an automatic calibration mode or a manual calibration mode of the procedure, the reference coordinate system of the safety helmet 60 can be reset to align to the coordinate system in the vehicle traveling direction (as shown in the right side of FIG. 12, which is a situation after calibration).

Figure 13:
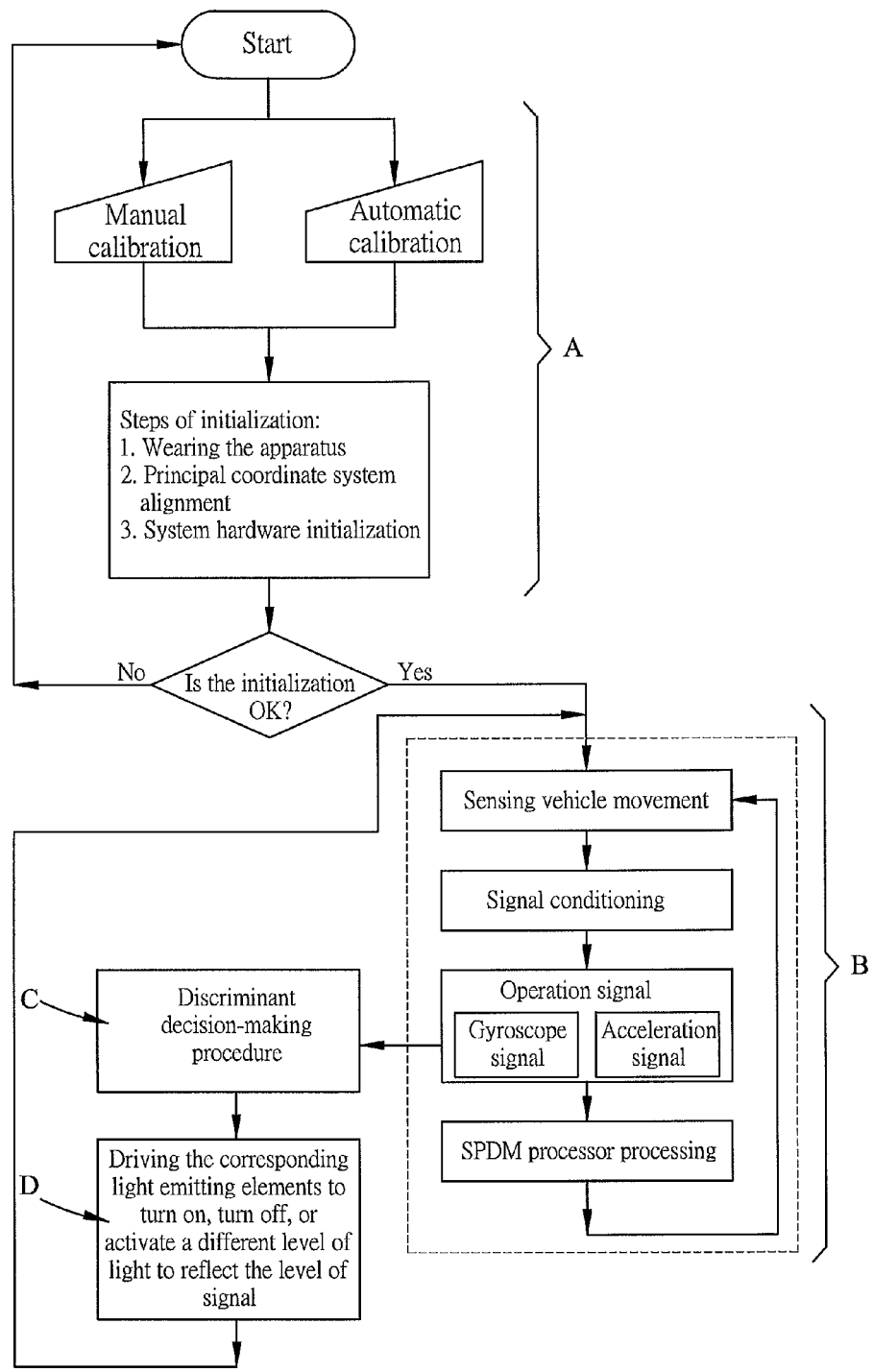
FIG. 13 is a flowchart showing that a SPDM processor performs a principal coordinate system calibration procedure and a discriminant decision-making procedure according to an embodiment of the present invention.

In an embodiment of the present invention, the SPDM processor 40 can combine this kind of principal coordinate system calibration procedure together with the discriminant decision-making procedure in a same line, and referring to the schematic flowchart in FIG. 13, the overall merged procedures includes mainly the following stages:

A: a stage of initial calibration: including a manual calibration mode and an automatic calibration mode.

In the manual calibration mode, the user only needs to wear the safety helmet 60 in a fixed desired pose and angle for driving, press initially a calibration button before driving the vehicle to travel along a direction which he wants to preset as the first principal axis PA1 for a constant time TS (for example, 3 seconds) to capture sufficient sample points as reference points. The first principal axis can therefore be obtained through a linear regression of these reference points. A first-order regression can be used for the alignment. For example, a least square linear regression is used in an embodiment of the present invention.

The procedure of the automatic calibration mode is generally similar to that of the manual calibration mode. In the automatic mode, the calibration button is thereby integrated with the power switch of the power supply device 50 (not shown in the figure), and the user only needs to wear the safety helmet 60 in a desired pose and angle for driving, turn on the power switch before driving first the vehicle along a direction of a straight distance which he wants to preset as the first principal axis PA1 for a period of time TS to capture the reference points; similar to the linear regression alignment of the manual calibration mode, the calibration is accomplished automatically.

B: a stage of sensing vehicle movement and outputting operation signals: after the foregoing principal coordinate system calibration procedure, the gyroscopic device 30 and acceleration sensor unit 90 start repeatedly sensing the vehicle movement and outputting the operation signals, including the gyroscope signals and the acceleration signals, the operation signals can also integrate with the plurality of auxiliary signals (including the first auxiliary signals and the second auxiliary signals).

C: a stage of generating an instantaneous discriminant signal: the SPDM processor 40 performs the discriminant decision-making procedure, based on the consecutive operation signals or the operation signals merging the plurality of the first auxiliary signals and the second auxiliary signals together, to generate the instantaneous discriminant signal.

D: a stage of driving the light emitting elements to operate: in this stage, the left light emitting element 21, middle light emitting element 20, and right light emitting element 22 are driven according to the discriminant signal to operate (including turning on, turning off, or activate a different level of light to reflect the significant level of movement).

According to an embodiment of the present invention, if the gyroscope 31, the two accelerometers 71a and 71b, the magnetometer 81, or the accelerometer 91, installed on the carrier 10, with only two principal axes being used, the first principal axis in the coordinate system still needs to align to the vehicle traveling direction to form a two-dimensional motion plane by introducing the orthogonal second principal axis. Such a sensing device (including the gyroscope 31, the two accelerometers 71a and 71b, the magnetometer 81, or the accelerometer 91) with only two principal axes can be regarded as a simplified version of the triaxial sensing device.

The discriminant decision-making procedure for warning the vehicle heading movement is briefly described as follows.

The gyroscope 31 in the gyroscopic device 30 detects consecutively, through continuously sampling the angular displacements of the vehicle turning, and generates the original operation signal containing a series of angular changes, $\Delta\phi_t$, t=1, 2, 3, . . . , where the angular change $\Delta\phi_t$ may be a positive value or a negative value depending on a vehicle turning direction. The discriminant decision-making procedure compares an absolute value of the instantaneous angular change $\Delta\phi_t$ with a set value $\theta$; when the absolute value of the angular change $\Delta\phi_t$ is greater than the set value $\theta$, a turning movement is therefore identified, and either one of the left light emitting element 21 or the right light emitting element 22 is activated to operate depending on the positive or negative value of $\Delta\phi_t$, respectively (turning on or flashing), so as to reflect the vehicle turning movement. Therein, the set value $\theta$ can be a fixed threshold, a function of measured angular rate from the gyroscopic, or a function of measured accelerations from the accelerometers.

The accelerometer 91 in the acceleration sensor unit 90 detects consecutively, through continuously sampling the speed changes of the vehicle proceeding, and generates the original operation signal containing a series of speed changes (accelerations) $\Delta v_t$, t=1, 2, 3, . . . in different levels. The discriminant decision-making procedure manipulates the levels of signal (an electric current) for driving the middle light emitting element 20 according to the acceleration levels. In other words, the discriminant decision-making procedure determines the luminance of the middle light emitting element 20 positively proportional to the instantaneous acceleration level in the operation signals, so as to reflect the strength of braking operation. The positively proportional relationship between the acceleration level and the luminance level can be manipulated by a key-value-pair mapping, a look-up table, a hash table, or a direct computation from an approximated function in the SPDM processor 40.

According to an embodiment of the present invention, the discriminant decision-making procedure therefore contains mainly two components, one is to manipulate the signals of angular changes $\Delta\phi_t$, and output a determination to actuate the left light emitting element 21 or the right light emitting element 22, and the other is to manipulate the signals of speed change $\Delta v_t$, and output a determination to actuate the middle light emitting element 20. For implementation, the two kinds of manipulation, based on the corresponding data structure for the operation signals, can be either implemented separately and executed consecutively as two sub-procedures (FIG. 14A), or merged together as a single procedure by means of an algorithmic arrangement (FIG. 14B).

Figure 14A:
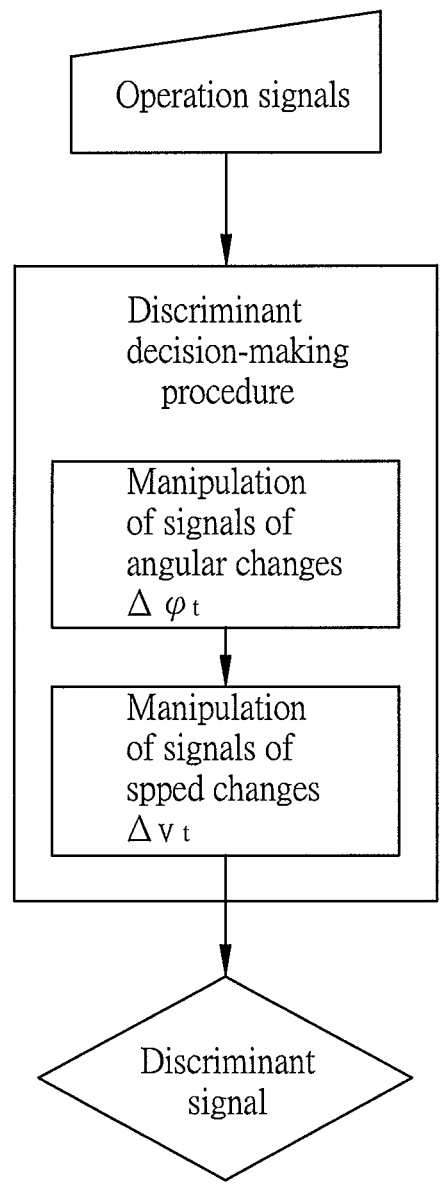
FIG. 14A is a cascaded scheme of a flowchart showing two kinds of signal manipulation schemes for manipulating both angular changes $\Delta\phi_t$ and speed changes $\Delta v_t$.
Figure 14B:
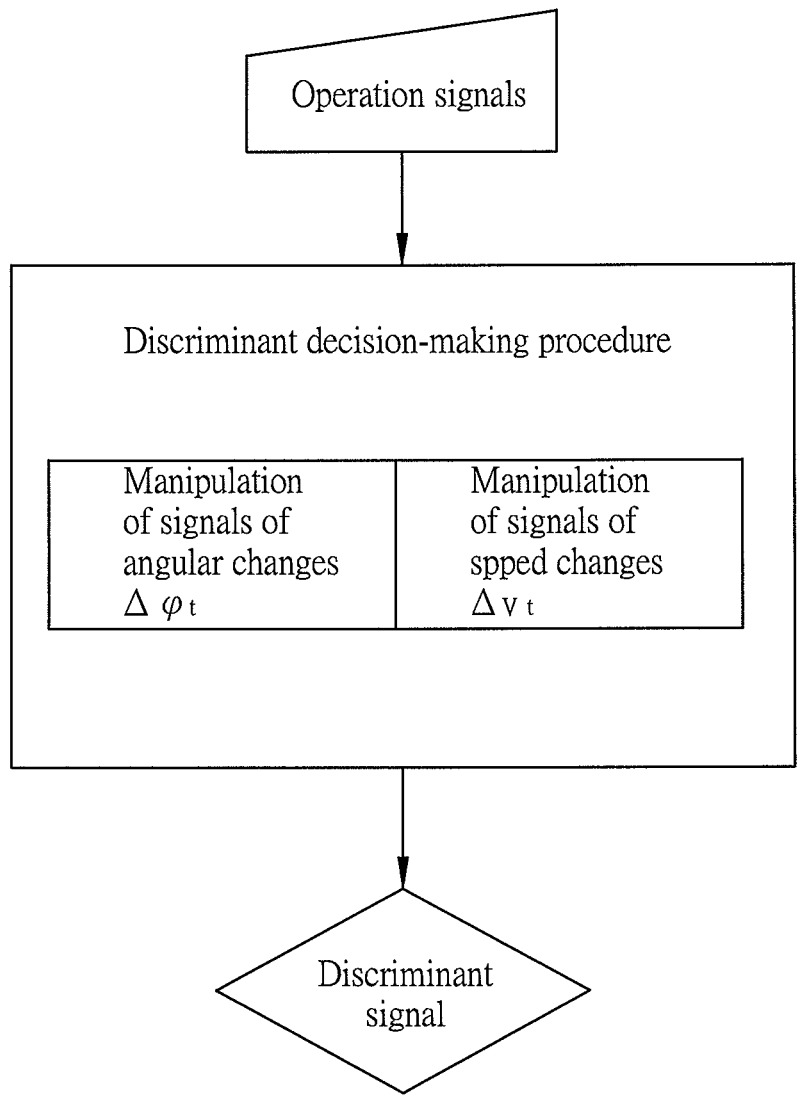
FIG. 14B is a parallel scheme of a flowchart showing two kinds of signal manipulation schemes for manipulating both angular changes $\Delta\phi_t$ and speed changes $\Delta v_t$.
Figure 15:
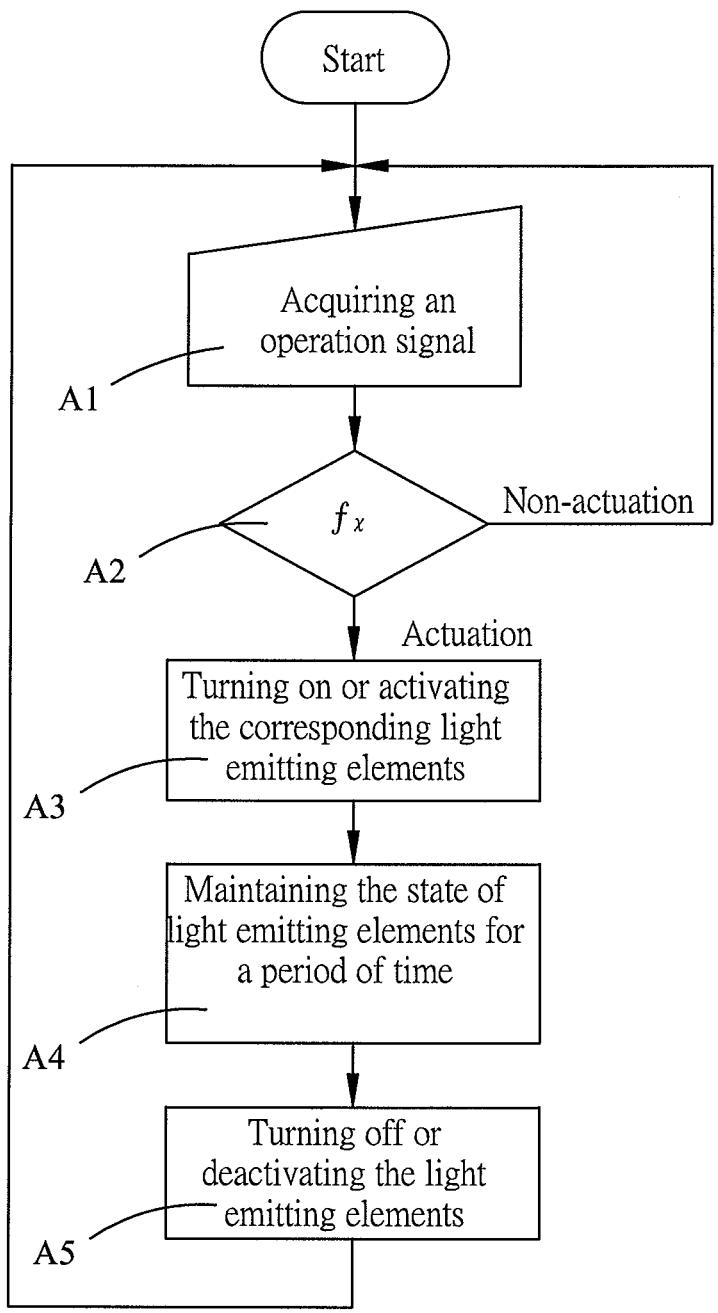
FIG. 15 is a flowchart showing that a SPDM processor performs a discriminant decision-making procedure according to an embodiment of the present invention.

Referring to the looped process shown in FIG. 15, there is an operational diagram to show the repeated actuations of the warning light emitting elements; in the figure, an enable/disable function $f_x$ corresponds to the discriminant signal output by the discriminant decision-making procedure in FIG. 14A or 14B. The implementation thereof can be described with a reference to an operation manner of a finite-state machine shown in FIG. 16, the looped process performed by the SPDM processor 40 includes the following steps:

A1: acquiring operation signals, where the operation signals contain at least an angular change $\Delta\phi_t$ in the embodiment, which have been converted into its digital form, and are loaded into the discriminant decision-making procedure by the SPDM processor 40 to produce a discriminant signal for the next step; in the other embodiment, the operation signals merge further the simultaneous speed changes together with the contained angular changes for producing the discriminant signal;

A2: based on the enable/disable function $f_x$ corresponding to the discriminant signal produced by step A1, a selective path is followed for actuating or non-actuating its corresponding light signal pattern; if yes, entering an actuation state and performing subsequent steps, and if not, entering a non-actuation state and looping back the foregoing step;

A3: turning on or activating the corresponding light emitting elements, where the corresponding light emitting elements are driven according to the discriminant signal;

A4: maintaining the state of the light emitting elements for a period of time; and A5: turning off or deactivating the light emitting elements.

The compound enable/disable function $f_x$ output from the discriminant decision-making procedure is an enclosure comprising a determination function $f_{x\phi}$ to actuate the turning light pattern and a determination function $f_{xv}$ to actuate the brake light pattern. In an implementation manner, the enabling/disabling of actuating the light signal pattern is determined depending on the simultaneous angular change $\Delta\phi_t$ and the speed change $\Delta v_t$ obtained sequentially along with time; the determination rules due to change of $\Delta\phi_t$ and change of $\Delta v_t$ are therefore described separately as follows:

If the absolute value of an angular change $\Delta\phi_t$ exceeds a set value $\theta$, either one of the left light emitting element 21 and right light emitting element 22 is activated to operate (turning on or flashing) for a delay time $TD_\phi$. The fragmental ON-states of angular change $\Delta\phi_t$, which are originally interval-spaced, can be thereof connected as a continuous period of ON-state to continuously enable a pattern of regular flashing light signal. Here, $TD_\phi$ can either be a fixed value, or be a scalable value correlated with the scale of the angular change $\Delta\phi_t$.

If an initial speed change $\Delta v_t$ exceeds a set value $u_b$ or a consecutive speed change exceeds a set value $u_c$, the middle emitting element 20 is activated to operate (turning on or activating different levels of light to reflect the level of speed change) for a delay time $TD_v$. The fragmental ON-states of speed change $\Delta v_t$, which are originally interval-spaced, can be thereof connected as a continuous period of ON-state to continuously enable a pattern of regular light signal even the fragmental ON-states are in different light levels. Here, $TD_v$ can either be a fixed value, or be a scalable value correlated with the scale of the angular change $\Delta v_t$.

Figure 16:
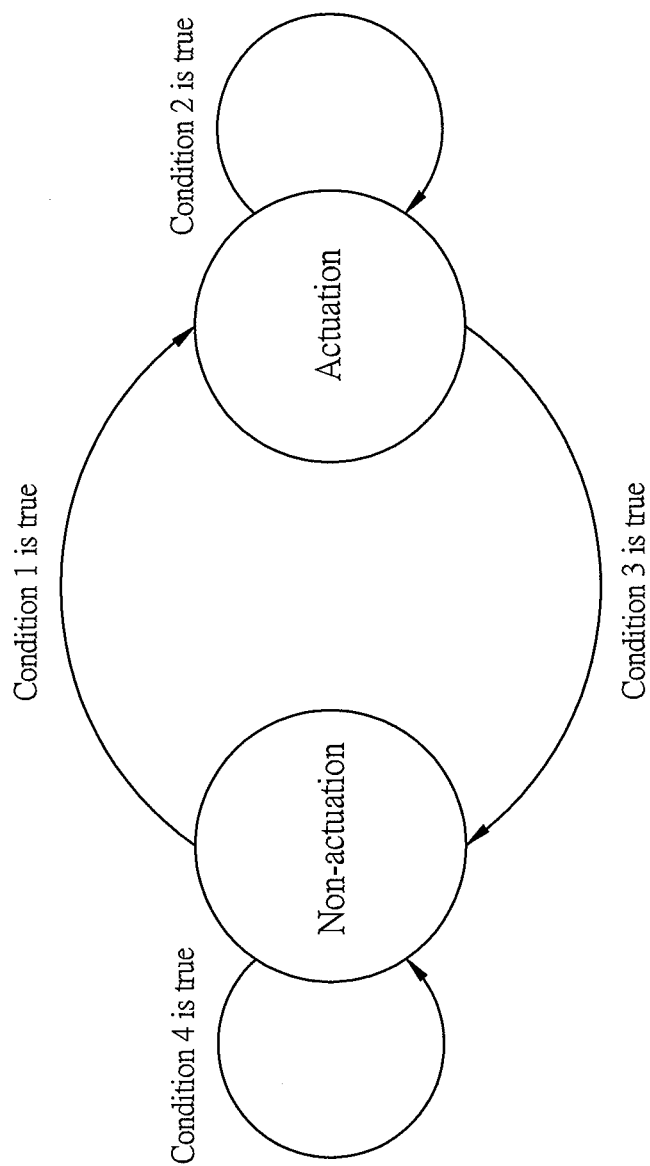
FIG. 16 is an operational illustration diagram according to the present invention.

According to the presented rules, an embodiment of the relationship between the enable/disable function $f_x$ for flashing a light signal pattern and either the angular change $\Delta\phi_t$ or the speed change $\Delta v_t$ can be summarized as a similar finite-state machine described in FIG. 16. Referring to it, the relationship can be decomposed into two states, including an activated state, a non-activated state, and four transition conditions. When one of the finite-state machines is in the activated state, the corresponding $f_x$, either one of $f_{x\phi}$ or $f_{xv}$, would be set to 1; otherwise, the corresponding $f_x$ would be reset to 0. The transition conditions for $f_{x\phi}$ are thereof set as:

| | |
|---|---|
| $|\Delta\phi_t|>\theta$ | Condition 1 |
| $|\Delta\phi_t|>\theta$ and sign($\Delta\phi_{t-1}$) | Condition 2 |
| sign($\Delta\phi_t$)≠sign($\Delta\phi_{t-1}$) or $|\Delta\phi_t|\leq\theta$ | Condition 3 |
| $|\Delta\phi_t|\leq\theta$ | Condition 4 | and, those for $f_{xv}$ as:

| | |
|---|---|
| $\Delta v_t<u_b$ | Condition 1 |
| $\Delta v_t<u_c$ | Condition 2 |
| $\Delta v_t\geq u_c$ | Condition 3 |
| $\Delta v_t\geq u_b$ | Condition 4 | where sign( ) represents a sign function, which is used to determine direction of the vehicle turning, the subscripts t−1 and t are used to indicate the consecutive time in measuring changes.

According to the foregoing embodiment, if the $TD_\phi$ or $TD_v$ of the delay is too long due to a non-interrupted loop-backs of condition 4, the delay can be suppressed or shorten after a certain count of the loop-backs (for example, five times of non-interrupted loop-backs of condition 4).

Figure 17:
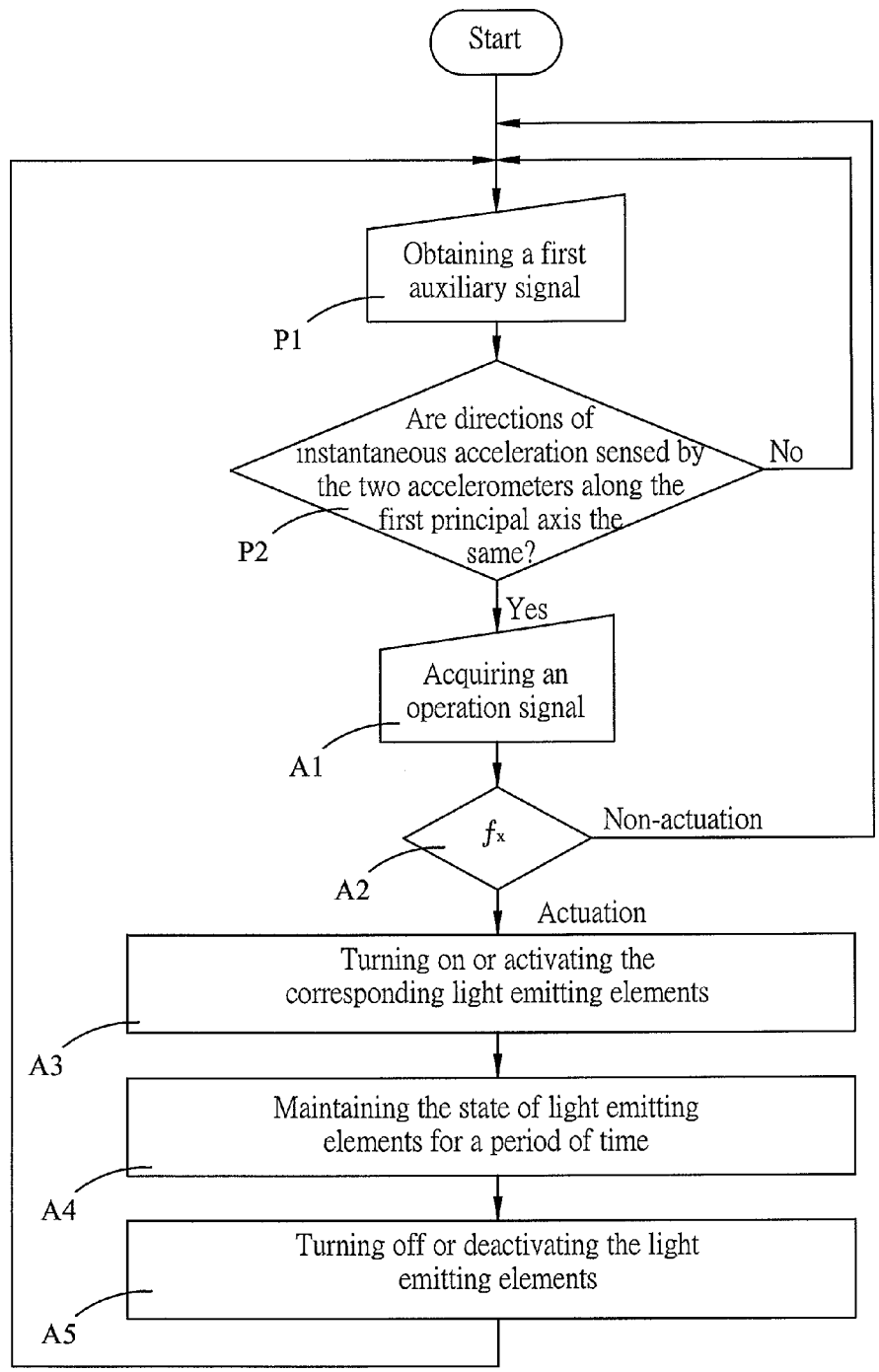
FIG. 17 is a flowchart showing that a SPDM processor merges the first auxiliary signals and the operation signals together to perform a discriminant decision-making procedure according to an embodiment of the present invention.

In another embodiment of the present invention, by merging the first auxiliary signal outputs which is generated by the first auxiliary sensor unit 70 to the operation signals, a real vehicle turning movement can be easier distinguished from a head or body turning movement, so as to prevent a misoperation. To provide particularly this function, the embodiment can be implemented by the flowchart in FIG. 15 with two additional steps inserted before step A1. The full implementation is shown in FIG. 17:

P1: obtaining simultaneously a first auxiliary signal together with the operation signal at time t; and P2: if directions of instantaneous acceleration sensed by the two accelerometers 71*a* and 71*b* are the same along the first principal axis, performing subsequent step A1; otherwise, looping back step P1; in other words, these subsequent processes can be adequately performed by the discriminant decision-making procedure only when both the directions of instantaneous acceleration by the two accelerometers 71*a* and 71*b* are the same along the first principal axis, so as to eliminate a misoperation caused by a head or body turning action.

The present invention automatically provides signals in real time to detect a heading status of a vehicle by using the sensory devices, and displays the corresponding light signals on a helmet of a driver. The vehicle with a helmet mainly refers to motorcycles, and also refers to bicycles, skateboards, and other sports equipment that requires a user to wear a safety helmet.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A helmet apparatus for automated vehicle heading alert, capable of being installed on headwear of a driver of a vehicle, comprising:
    a carrier, detachable from the headwear;
    a plurality of light emitting elements, installed on the carrier, comprising a left light emitting element and a right light emitting element;
    a gyroscopic device, installed on the carrier, and comprising at least one gyroscope, used for detecting an operation of the vehicle and outputting a series of gyroscope signals corresponding to the operation;
    a signal-processing and decision-making (SPDM) processor which receives the gyroscope signals to form a series of operation signals, processes the operation signals, performs a discriminant decision-making procedure, generates consecutively discriminant signals corresponding to the operation signals, and drives accordingly either the right light emitting element or the left light emitting element to turn on, turn off, or flash; and
    a power supply device, used for supplying power required by at least of the right light emitting element and the left light emitting element, the gyroscopic device, and the SPDM processor;
    wherein the SPDM processor comprises:
    a digital signal processing and filtering unit, used for performing filter processing on the operation signal; and
    a discrimination and processing unit, comprising a memory, a logic operation processor, and an input/output (I/O) port, wherein the left light emitting element and the right light emitting element are electrically connected to the I/O port, the memory has the discriminant decision-making procedure therein, used for generating the discriminant signals and driving accordingly at least one of the left light emitting element and the right light emitting element through the I/O port.

2. The helmet apparatus for automated vehicle heading alert according to claim 1, wherein the carrier is attached to the headwear through at least one of a magnet, a fastening member, and a velcro tape.

3. The helmet apparatus for automated vehicle heading alert according to claim 1, wherein the gyroscope is biaxial or triaxial.

4. The helmet apparatus for automated vehicle heading alert according to claim 1, wherein the gyroscopic device detects angular changes of a turning of the vehicle.

5. The helmet apparatus for automated vehicle heading alert according to claim 4, wherein the SPDM processor acquires the angular changes to form the operation signals, and compares elementarily at least an absolute value of the operation signals with a set value; the SPDM processor generates, based on the comparison, an elementarily discriminant signal to activate either the left light emitting element or the right light emitting element, which depends basically on whether the angular change is a positive or a negative value respectively, when the angular change is greater than the set value.

6. The helmet apparatus for automated vehicle heading alert according to claim 5, wherein the set value is a fixed threshold, a scalable value correlated with the scale of the angular change in the gyroscopic device, or a scalable value correlated with the scale of the speed change in the acceleration sensor unit.

7. The helmet apparatus for automated vehicle heading alert according to claim 1, wherein the gyroscopic device further comprises a signal modulator used for modulating the original signals in an analog form into the signals in a digital form.

8. The helmet apparatus for automated vehicle heading alert according to claim 1, comprising a middle light emitting element and an acceleration sensor unit, wherein the acceleration sensor unit is installed on the carrier and at least comprises an accelerometer, used for detecting acceleration changes of the vehicle and outputting a series of acceleration signals, the SPDM processor generates the discriminant signal by estimating and approximating the levels of the acceleration signals, and drives the middle light emitting element, according to the discriminant signal, to turn on, turn off, or activate different levels of light to reflect different operations of the vehicle.

9. The helmet apparatus for automated vehicle heading alert according to claim 8, wherein the accelerometer is biaxial or triaxial.

10. The helmet apparatus for automated vehicle heading alert according to claim 8, the SPDM processor determines the luminance of the middle light emitting element according to the acceleration signal, wherein the luminance of the middle light emitting element is proportional to the acceleration change.

11. The helmet apparatus for automated vehicle heading alert according to claim 8, wherein the SPDM processor further acquires the acceleration signals together with the gyroscope signals to form the operation signals, and compares elementarily at least an initial speed change or a consecutive speed change of the operation signals with a first set value and a second set value, respectively; the SPDM processor generates, based on the comparison, an elementarily discriminant signal to activate the middle light emitting element.

12. The helmet apparatus for automated vehicle heading alert according to claim 11, wherein the first set value and the second set value are fixed thresholds, or scalable values correlated with the scale of the speed change in the acceleration sensor unit.

13. The helmet apparatus for automated vehicle heading alert according to claim 8, wherein the discriminant decision-making procedures and corresponding consequent discriminant signals to activate the left or right light emitting element and the middle light emitting element are either compounded into integrated ones or individually separated as standalone ones.

14. The helmet apparatus for automated vehicle heading alert according to claim 1, further comprising: a first auxiliary sensor unit, wherein the first auxiliary sensor unit comprises at least two accelerometers, used for detecting an operation of the vehicle, outputting a series of first auxiliary signals, and delivering the first auxiliary signals together with the operation signals to the SPDM processor, the SPDM processor is allowed to process and discriminate the operation signals only when directions along a first principal axis of instantaneous acceleration sensed by the two accelerometers are the same, and the SPDM processor generates the corresponding discriminant signal.

15. The helmet apparatus for automated vehicle heading alert according to claim 14, wherein the two accelerometers are separately installed at two sides of the headwear, the two sides are divided by an axis which passes through the center of the head of the wearer and aligns to the traveling direction of the vehicle.

16. The helmet apparatus for automated vehicle heading alert according to claim 1, further comprising a second auxiliary sensor unit, wherein the second auxiliary sensor unit at least comprises an accelerometer or a magnetometer, used for detecting an operation of the vehicle, outputting a series of second auxiliary signals, and delivering the second auxiliary signals together with the operation signals to the SPDM processor, so as to calibrate bias of the gyroscopic device caused by a gyroscope drift.

17. The helmet apparatus for automated vehicle heading alert according to claim 1, further comprising a principal coordinate system calibration procedure, wherein the procedure is performed by the SPDM processor, and the principal axis of the principal coordinate system aligns to the instantaneous vehicle traveling direction by means of coordinate system transformation from a reference coordinate system, the principal coordinate system calibration is used to map every axes in the sensing components disposed at the carrier exactly to the defined principal axes.

18. The helmet apparatus for automated vehicle heading alert according to claim 1, wherein the power supply device is a primary cell, a rechargeable cell with a charging mechanism, a solar cell, or is connected to a power source of the vehicle through power lines and electric connectors, which directly uses power from the vehicle.

19. A helmet apparatus for automated vehicle heading alert, capable of being installed on headwear of a driver of a vehicle, comprising:
  a carrier, detachable from the headwear;
  a plurality of light emitting elements, installed on the carrier, comprising a left light emitting element and a right light emitting element;
  a gyroscopic device, installed on the carrier, and comprising at least one gyroscope, used for detecting an operation of the vehicle and outputting a series of gyroscope signals corresponding to the operation;
  a signal-processing and decision-making (SPDM) processor which receives the gyroscope signals to form a series of operation signals, processes the operation signals, performs a discriminant decision-making procedure, generates consecutively discriminant signals corresponding to the operation signals, and drives accordingly either the right light emitting element or the left light emitting element to turn on, turn off, or flash;
  a power supply device, used for supplying power required by at least of the right light emitting element and the left light emitting element, the gyroscopic device, and the SPDM processor; and a middle light emitting element and an acceleration sensor unit, wherein the acceleration sensor unit is installed on the carrier and at least comprises an accelerometer, used for detecting acceleration changes of the vehicle and outputting a series of acceleration signals, the SPDM processor generates the discriminant signal by estimating and approximating the levels of the acceleration signals, and drives the middle light emitting element, according to the discriminant signal, to turn on, turn off, or activate different levels of light to reflect different operations of the vehicle.

20. A helmet apparatus for automated vehicle heading alert, capable of being installed on headwear of a driver of a vehicle, comprising:
a carrier, detachable from the headwear;
a plurality of light emitting elements, installed on the carrier, comprising a left light emitting element and a right light emitting element;
a gyroscopic device, installed on the carrier, and comprising at least one gyroscope, used for detecting an operation of the vehicle and outputting a series of gyroscope signals corresponding to the operation;
a signal-processing and decision-making (SPDM) processor which receives the gyroscope signals to form a series of operation signals, processes the operation signals, performs a discriminant decision-making procedure, generates consecutively discriminant signals corresponding to the operation signals, and drives accordingly either the right light emitting element or the left light emitting element to turn on, turn off, or flash;
a power supply device, used for supplying power required by at least of the right light emitting element and the left light emitting element, the gyroscopic device, and the SPDM processor; and
a first auxiliary sensor unit, wherein the first auxiliary sensor unit comprises at least two accelerometers, used for detecting an operation of the vehicle, outputting a series of first auxiliary signals, and delivering the first auxiliary signals together with the operation signals to the SPDM processor, the SPDM processor is allowed to process and discriminate the operation signals only when directions along a first principal axis of instantaneous acceleration sensed by the two accelerometers are the same, and the SPDM processor generates the corresponding discriminant signal.

* * * * *